United States Patent

Hattori et al.

[11] Patent Number: 5,993,018
[45] Date of Patent: Nov. 30, 1999

[54] MIRROR POSITION DETECTION DEVICE

[75] Inventors: Norikazu Hattori, Shimizu; Naoto Iwanabe, Fujieda; Michiaki Hattori, Fujieda; Toshihiro Mochizuki, Fujieda; Toru Okamoto, Fujieda, all of Japan

[73] Assignee: Murakami Corporation, Shizuoka-ken, Japan

[21] Appl. No.: 09/046,155

[22] Filed: Mar. 23, 1998

[30] Foreign Application Priority Data

Mar. 25, 1997 [JP] Japan ................................ 9-088713

[51] Int. Cl.⁶ .................................................. G02B 7/182
[52] U.S. Cl. ............................................. 359/877; 359/872
[58] Field of Search .................................. 359/872, 877, 359/843; 338/68

[56] References Cited

U.S. PATENT DOCUMENTS

| | | | |
|---|---|---|---|
| 4,504,117 | 3/1985 | Mittelhauser | 359/872 |
| 4,770,522 | 9/1988 | Alten | 359/877 |

FOREIGN PATENT DOCUMENTS

| | | |
|---|---|---|
| 57-157548 | 3/1982 | Japan . |
| 58-1 15 440 | 6/1983 | Japan . |
| 10067281 | 3/1998 | Japan . |
| 2 207 508 | 2/1989 | United Kingdom . |
| 2 290 147 | 12/1995 | United Kingdom . |
| WO 97/03863 | 2/1997 | WIPO . |

Primary Examiner—Cassandra Spyrou
Assistant Examiner—Jared Treas
Attorney, Agent, or Firm—Michael J. Striker

[57] ABSTRACT

In a device for detecting mirror position, there is provided a resistor substrate being located coaxially with a nut adjuster for adjusting an angle of incline of a mirror, and a contact member so as to nip the resistor substrate. The contact member slides in line corresponding to the movement of the nut adjuster while the resistor substrate is fixed to a housing. Thus, as the nut adjuster slides, the contact member slides against the resistor substrate, which results the change of a contact position of the contact member and a long resistance R1. Consequently, since a voltage level generated at the contact member changes, the angle of incline of the mirror can be determined by detecting this voltage level. Inasmuch as the contact member and the resistor substrate are housed within a sliding block, there is no need for much space to locate the various parts in, and thus the whole device can be configured in a compact manner.

In addition, the fact that the resistance R1 is connected to the direct-current power source via resistances R2 and R3 means that the measured voltage level is acquired in the form of an intermediate value of the direct-current power source voltage. Subsequently, it is possible to reduce the influence of noise and other factors so that the mirror angle can be detected with a high degree of accuracy.

6 Claims, 7 Drawing Sheets

Prior Art

FIG.13A
prior Art

FIG.13B
Prior Art

MIRROR POSITION DETECTION DEVICE

BACKGROUND OF THE INVENTION

1. Field of the Invention

The present invention relates to an automobile mirror whereof the angle of incline can be altered by means of remote control, and in particular to a technique for detecting the angle of incline of the mirror.

2. Description of the Prior Art

Generally speaking, the angle of incline of automobile mirrors needs to be adjusted to suit the driver. Since it is very troublesome to perform operations of this sort by hand, various means of adjusting the angle of the mirror by remote control have hitherto been employed.

Adjustment of the mirror angle in this manner is normally achieved by locating sliding rods in suitable positions in the up-down and left-right directions on the rear side of the mirror, and then moving these sliding rods. In other words, the action of moving the sliding rod which is attached in the up-down direction of the mirror causes it to incline upwards or downwards, while moving the sliding rod which is attached in the left-right direction of the mirror causes it to move to the left or to the right. This allows the mirror angle to be adjusted to the desired position by means of remote control.

Since the angle of incline of the mirror normally differs from driver to driver, fine adjustment is required every time the driver changes. Moreover, when a vehicle is being put into a garage, it is convenient for the driver to have the vicinity of the rear wheels of the vehicle within the field of vision. Even so, it is troublesome if the angle of the mirror needs to be adjusted by remote control in order to bring the rear wheels within the field of vision of the mirror whenever the vehicle is being put into a garage. Suggestions have hitherto been made for a mirror position detection device to detect the angle of incline of the mirror. If such a mirror position detection device is coupled to the tilting mechanism of the mirror, it becomes possible to adjust the mirror to the desired angle at a single touch. In other words, where more than one person drives a vehicle, the facility to have a device memorise the mirror angle for each driver allows the angle of incline of the mirror to be adjusted at a single touch to the one best suited to each driver, thus not only making adjustment of the angle very simple, but also making it possible to adjust the angle at a single touch so that the vicinity of the rear wheels can be seen when the vehicle is being put into a garage.

Figure 12:
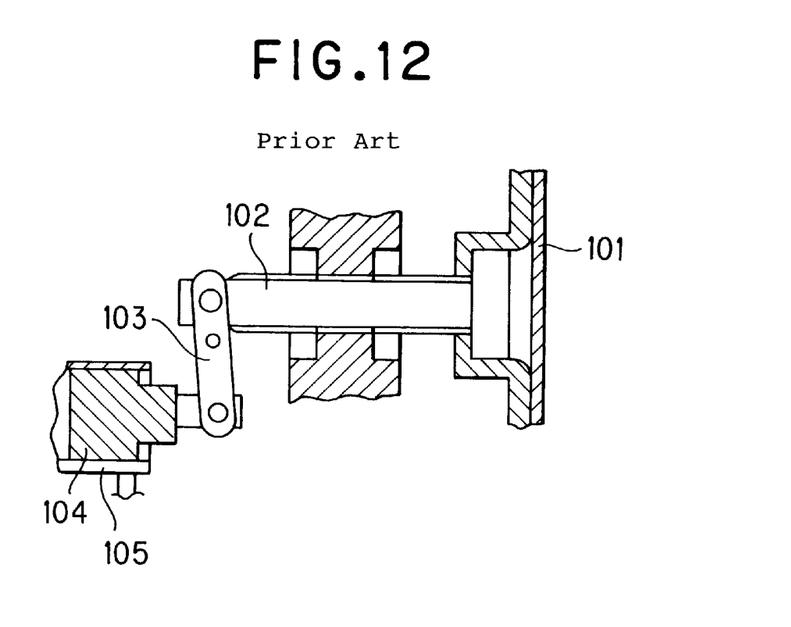
FIG. 12 is an explanatory diagram demonstrating what is described in Conventional Example 1.

Examples of conventional mirror position detection devices are provided by Japanese Utility Model S57[1982]-157548 (hereinafter referred to as Conventional Example 1) and Japanese Utility Model S58[1983]-115440 (hereinafter referred to as Conventional Example 2). FIG. 12 is an explanatory diagram demonstrating the technical details of the mirror position detection device described in Conventional Example 1. As will be seen from FIG. 12, in this mirror position detection device a contact holder 104 is attached via a link 103 to the trailing edge of an operational shaft 102 which by pushing and pulling serves to tilt the mirror 101. The sliding movement of this contact holder 104 causes the resistance value of a variable resistor 105 to vary, and it is by measuring this resistance value that the angle of incline of the mirror 101 is detected. However, the mirror position detection device described in Conventional Example 1 suffers from the disadvantage that it requires extra space to locate it because the contact holder 104 is attached to the trailing edge of the operational shaft 102, which means that it is impossible to make the whole of the mirror housing more compact.

Figure 13A:
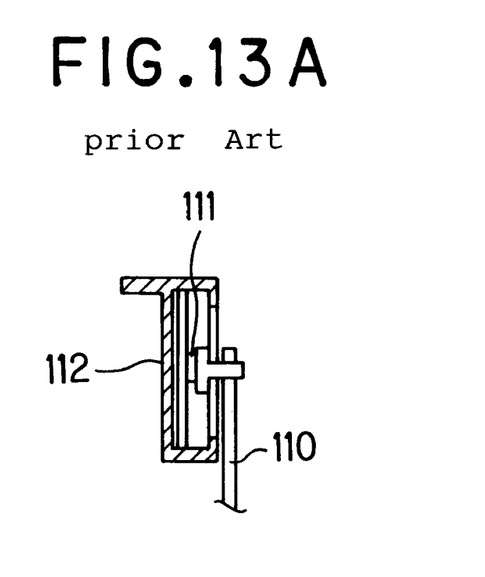
Figure 13B:
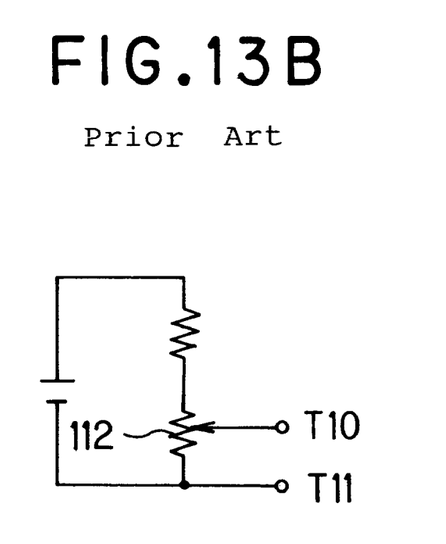

FIG. 13 is an explanatory diagram demonstrating the technical details of the mirror position detection device described in Conventional Example 2. As is shown in FIG. 13 (A), the sliding movement of a drive shaft 110 causes the mirror to tilt, while a contact 111 slides in line with this along a variable resistor 112. This causes the resistance value of the variable resistor 112 to vary, and it is by measuring this resistance value that the angle of incline of the mirror 101 is detected. Meanwhile, FIG. 13 (B) is a diagram showing the mirror position detection device and the electric equalising circuit. This is configured in such a manner as to detect the voltage level between terminals T10 and T11, which changes with the movement of the drive shaft 110. By detecting this voltage level it is possible to measure the distance which the drive shaft 110 moves, thus allowing the angle of incline of the mirror to be detected. However, the mirror position detection device described in Conventional Example 2 suffers from the same disadvantage as the one described in Conventional Example 1 in that the variable resistor 112 is located on the trailing edge of the drive shaft 110, which means that it is impossible to conserve space.

A further disadvantage is the fact that, as will be seen from FIG. 13 (B), the voltage level which is measured between the terminals T10 and T11 is acquired as a value based on 0 volts. In other words, if the voltage level which is impressed on both ends of the variable resistor 112 is represented as V2, the voltage level between the terminals T10 and T11 is measured in the range 0–V2 volts. The use of a low voltage level close to 0 volts as a detection signal leads to poor accuracy of detection resulting from the effect of noise and other factors, and it is impossible to detect the position with an great degree of accuracy.

Thus, conventional mirror position detection devices are flawed in that the attachment of a variable resistor to the trailing edge of a shaft which serves to tilt the mirror means that they require a large amount of space. Meanwhile, the measurement of voltage levels in a range between 0 and a few volts by connecting a detection contact to a variable resistor which changes according to the angle of incline of the mirror means that it is easily affected by noise and other factors, so that accurate position detection is not possible.

It is an object of the present invention to provide a mirror position detection device which does not require much space for locating its various parts, and which allows the angle of the mirror to be detected with a high degree of accuracy.

SUMMARY OF THE INVENTION

According to one of the preferred embodiments, the mirror position detection device to which the present invention pertains is configured in such a manner that a resistor substrate is located within a sliding block which is itself located coaxially with a nut adjuster, there being nipped to the resistor substrate a contact member which slides in line with the movement of the nut adjuster. Or one side of the resistor substrate is located a long resistance R1, while a conductor is provided on the other side. The two ends of the resistance R1 are connected to a direct-current power source via resistances R2 and R3 respectively. The contact member permits continuity between the resistance R1 and the conductor, with the result that a voltage signal of a level corresponding to the contact position with the contact member is generated in the conductor. In other words, it is possible to acquire a voltage level corresponding to the movement of the nut adjuster, thus allowing the angle of incline of the mirror to be determined by detecting this voltage level.

Inasmuch as the resistor substrate and contact member are located and housed within the sliding block, there is no need for much space to locate the various parts in, and the whole device can be configured in a compact manner. In addition, the fact that the resistance R1 is connected to the direct-current power source via the resistances R2 and R3 means that the measured voltage level is acquired in the form of an intermediate value of the direct-current power source voltage, and that it is possible to detect the mirror angle with a high degree of accuracy unaffected by noise and other factors.

BRIEF DESCRIPTION OF THE DRAWINGS

FIG. 3 (A) illustrates the state of the front side of the resistor substrate, while FIG. 3 (B) illustrates to state of the rear side of the resistor substrate;

FIG. 13 are explanatory diagrams demonstrating what is described in Conventional Example 2, wherein (A) shows the state of contact between the variable resistor and the contact, and (B) is the electric equalising circuit.

DESCRIPTION OF THE PREFERRED EMBODIMENT

Figure 1:
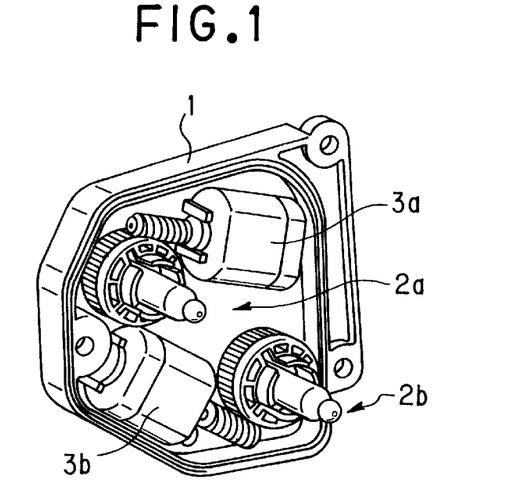
FIG. 1 is an oblique view of the internal structure of a door mirror on which is mounted the mirror position detection device to which the present invention pertains.

FIG. 1 is an oblique view depicting the internal structure of a door mirror including the mirror position detection device to which the present invention pertains. Within the housing 1 which forms the exterior of the mirror are located two tilting mechanisms 2 (2a, 2b), to each of which is linked a motor 3 (3a, 3b) for the purpose of driving it. The rotational drive of these motors 3 causes the respective tilting mechanisms 2 to slide, enabling the mirror which is attached to the leading edge of the tilting mechanisms to be tilted up and down, or right and left.

Figure 2:
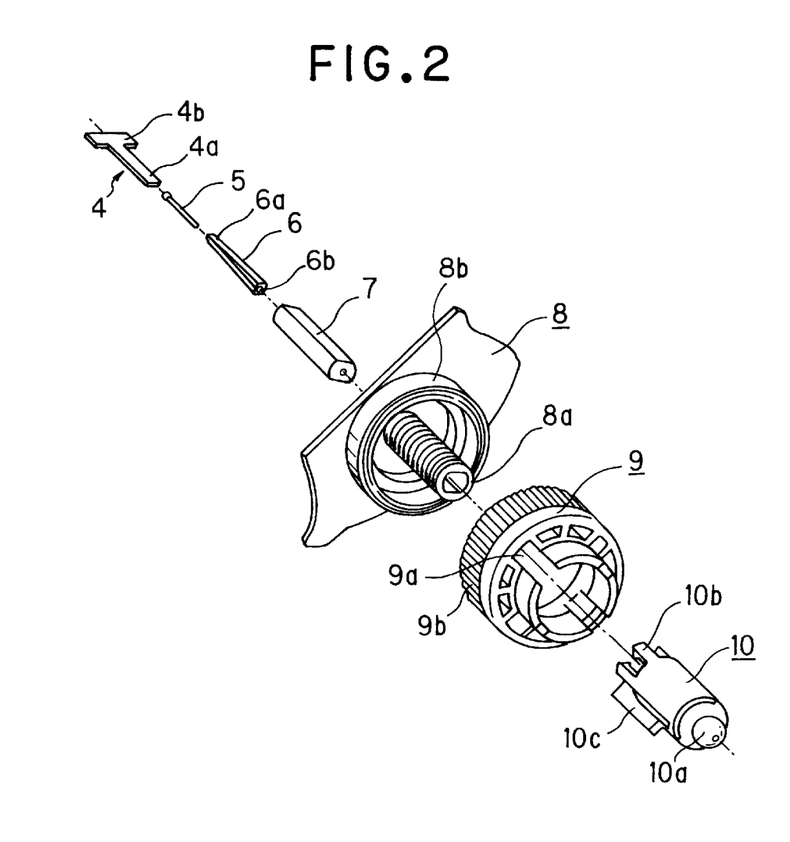
FIG. 2 is an exploded oblique view showing the detailed structure of the mirror position detection device to which the first embodiment of the present invention pertains.

As FIG. 2 shows, the tilting mechanisms 2 comprise a screw member 8, a nut adjuster (sliding rod) 10, a gear 9 for the purpose of adjusting the mirror, a sliding block 7, a resistor substrate 4 which is inserted within the sliding block 7, a contact member 6 which nips the front and rear sides of the resistor substrate 4 and guides it through, and a pin (means of connection) 5 which serves to join the sliding block 7 and the nut adjuster 10 in such a manner that they are capable of rotating.

In the centre of the screw member 8 is formed a hollow male screw element 8a, while on the periphery is formed a ring-shaped rim 8b. On the leading edge of the nut adjuster 10 is formed a spherical pivot 10a, while on the trailing edge are formed five claws (screw bodies) 10b which engage with the male screw element 8a of the screw member 8, and a stopper 10c is attached to the side.

The gear 9 for the purpose of adjusting the mirror has on its inner periphery a groove 9a which engages with the stopper 10c of the nut adjuster 10, while on the outer periphery is formed a gear element 9b which engages and links with the motor 3 shown in FIG. 1. The sliding block 7 is inserted within the male screw element 8a of the screw member 8 so as to prevent rotation against the screw member 8.

Figure 3A:
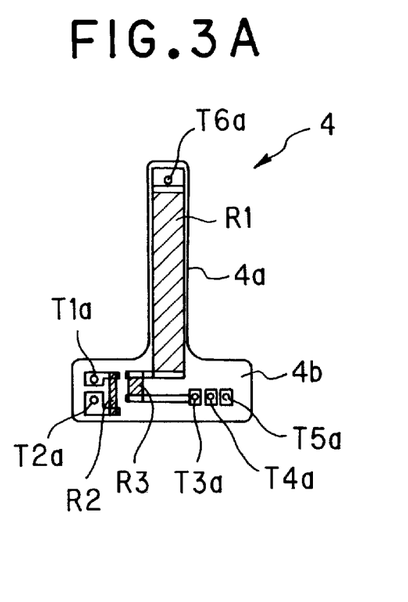
Figure 3B:
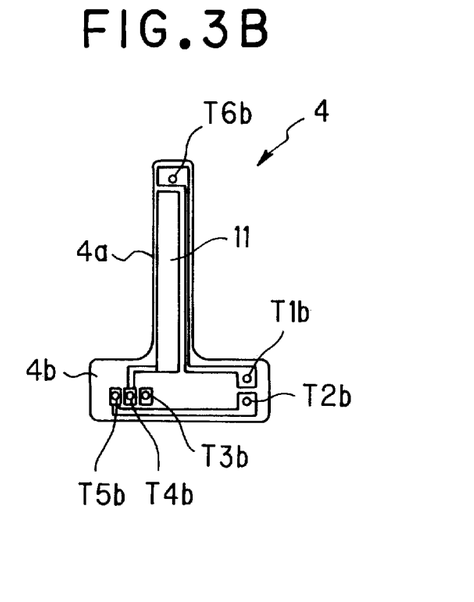

As FIGS. 3 (A) and (B) show, the resistor substrate 4 is flat and T-shaped. On it are formed six terminals T1–T6, the suffixes a and b denoting front side and rear side respectively. It will be seen from FIG. 3 (A) that a long resistance R1 (first resistance) is attached to the front side of the long member 4a of the resistor substrate 4. One end of this resistance R1 is connected to the terminal T6, while the other end is connected via a short resistance R3 (third resistance) to the terminal T3. A short resistance R2 (second resistance) is similarly attached between the terminals T1 and T2.

Meanwhile, it will be seen from FIG. 2 (B) that a long conductor 11 is attached to the rear side of the long member 4a of the resistor substrate 4. One end of this conductor 11 is not connected to the terminal T6, while the other end is connected to the terminal T4. The terminals T1 and T6 are connected, as are the terminals T2 and T5. As will be explained later, the terminal T5 is connected to a power source terminal, the terminal T3 to an earth terminal, and the terminal T4 to a sensor output terminal. In other words, there is located between the terminals T3 and T4 a means of measuring the voltage (not illustrated in the drawings), whereby it is possible to measure the voltage level.

Figure 4:
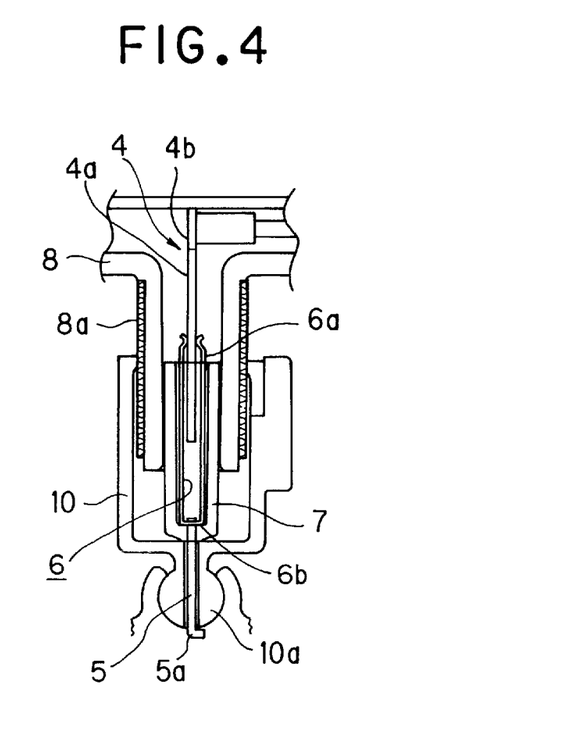
FIG. 4 is a cross-sectional view of the mirror position detection device illustrated in FIG. 2, and demonstrates how the nut adjuster is located more or less centrally in the screw member.

As FIG. 4 shows, the long member 4a of the resistor substrate 4 illustrated in FIG. 3 is inserted into the sliding block 7, which is in turn inserted into the male screw element 8a of the screw member 8. In addition, the contact member 6 is provided in order to nip the front and rear sides of the resistor substrate 4. As may be seen from FIG. 4, the contact member 6 is formed like a pair of pincers with the leading edges 6a protruding inwards. It is this protruding section which forms the contact. The bent-round section 6b of the contact member 6 has a small aperture into which is inserted a pin 5. This pin 5 passes through the sliding block 7 and the spherical pivot 10a of the nut adjuster 10, its tip 5a being bent round and thereby fixed. By virtue of the fixing of this pin 5, the contact member 6 slides in accordance with the movement of the nut adjuster 10, but is not linked to the rotation of the nut adjuster 10, being prevented from rotating even if the latter does so.

Figure 8:
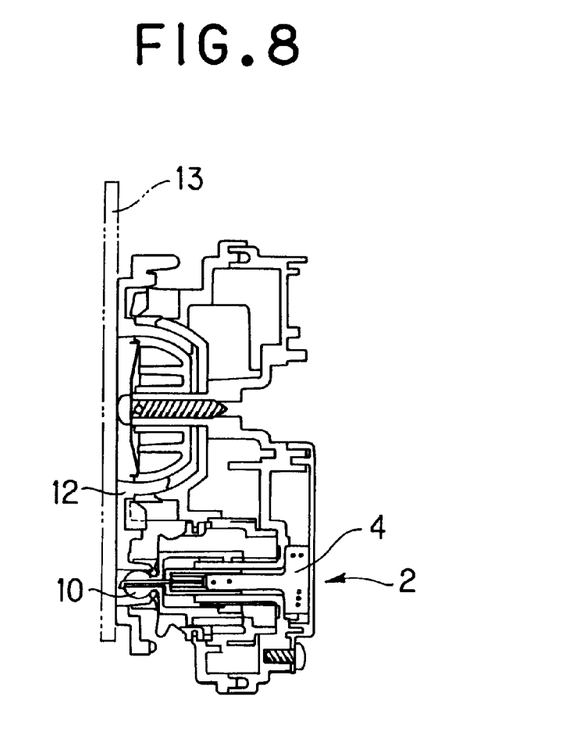
FIG. 8 is an explanatory diagram demonstrating how the tilting mechanism is fitted to the rear side of the mirror.

FIG. 8 is an explanatory diagram demonstrating how the tilting mechanism 2 is fitted to the rear side of the mirror. When the nut adjuster 10 moves, a plate pivot 12 inclines, as does also the mirror 13 which is fixed to the plate pivot 12.

Such being the configuration of the present embodiment, there now follows a description of the manner of its operation. When the motor 3 (3a, 3b) shown in FIG. 1 is rotated and driven in order to incline the mirror 13 shown in FIG. 8, the gear 9 for the purpose of adjusting the mirror is also rotated and driven, being linked to the motor 3 by means of the gear element 9b (cf. FIG. 2). Meanwhile, the stopper 10c which is formed on the side of the nut adjuster 10 interlocks with the groove 9a which is formed on the inner periphery of the gear 9, as a result of which the nut adjuster 10 also comes to rotate in line with the rotation of the gear 9. As has already been explained, the claws 10b of the nut adjuster 10 connect by engaging with the male screw element 8a of the screw member 8, and by virtue thereof move in the longitudinal direction of the male screw element 8a. That is to say, when the nut adjuster rotates in one direction, it moves towards the leading edge of the male screw element 8a, while if it rotates in the opposite direction, it moves towards the base of the male screw element 8a. Thus, angles of the plate pivot 12 and mirror 13, which are connected to the spherical pivot 10a of the nut adjuster 10 (cf. FIG. 8), change as a result of the movement of the nut adjuster 10.

Figure 5:
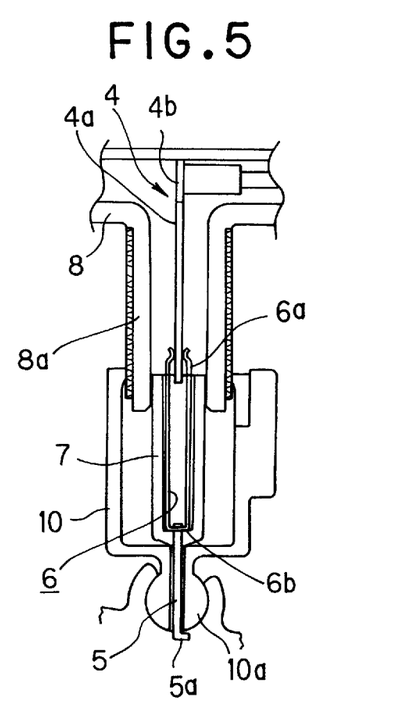
FIG. 5 is a cross-sectional view of the mirror position detection device illustrated in FIG. 2, and demonstrates how the nut adjuster is located on the leading edge of the screw member.
Figure 6:
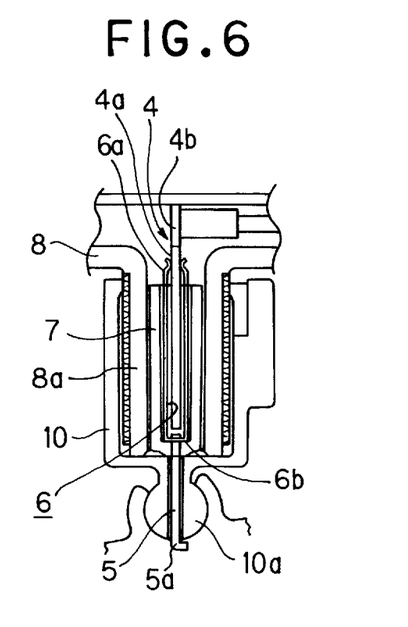
FIG. 6 is a cross-sectional view of the mirror position detection device illustrated in FIG. 2, and demonstrates how the nut adjuster is at the base of the screw member.

Moreover, the movement of the nut adjuster 10 against the male screw element 8a causes the contact member 6 also to move against the resistor substrate 4. When the nut adjuster 10 slides in the direction of the projection, the leading edge 6a of the contact member 6 comes into contact with the leading edge of the resistor substrate 4, as is shown in FIG. 5. Meanwhile, when it slides in the direction of the base, the leading edge 6a of the contact member 6 comes into contact with the base of the resistor substrate 4, as is shown in FIG. 6. Consequently, the position of contact between the leading edge 6a of the contact member 6 and the resistance R1 changes according to the position of the nut adjuster 10.

To explain this in greater detail with reference to FIG. 3, a power source potential and earth potential are connected respectively to the terminals T5 and T3, and the current follows a course through T5a, T5b, T2b, T2a, R2, T1a, T1b, T6b, T6a, R1, R3 and T3a in that order. Moreover, the resistance R1 and the conductor 11, which is on its rear side, are connected via the contact member 6, while conductor 11 is connected to the terminal T4 (sensor output). Thus, voltage corresponding to the position of the leading edge 6a of the contact member 6 is generated in the terminal T4.

That is to say, when the nut adjuster 10 is positioned at the leading edge of the male screw element 8a as is shown in FIG. 5, the resistance value according to the resistance R1 is great, as a result of which the voltage generated in the terminal T4 is also great. Conversely, when the nut adjuster 10 is positioned at the base of the male screw element 8a as is shown in FIG. 6, the resistance value according to the resistance R1 is small, which means that the voltage generated in the terminal T4 is also small. In other words, the resistor substrate illustrated in FIG. 3 can be represented by the equalising circuit illustrated in FIG. 7. The fact that the position of contact between the terminal T4 and the resistance R1 changes according to the position of the nut adjuster 10 means that the voltage level of the terminal T4 also changes as a result. Consequently, by reading the voltage level of the terminal T4 with the aid of the voltmeter 14 (means of measuring voltage), it is possible to discover the current position of the nut adjuster 10 in relation to the screw member 8, and thus to detect the angle of incline of the mirror 13.

Thus, the present embodiment is configured in such a manner that with the aid of the resistor substrate 4 which is fixed to the housing 1, and the contact member 6 which slides in line with the movement of the nut adjuster 10, a voltage signal corresponding to the angle of incline of the mirror 13 is generated in the terminal T4, allowing the current angle of incline of the mirror 13 to be detected. Moreover, since both the resistor substrate 4 and the contact member 6 are housed and located within the male screw element 8a of the screw member 8, there is no need for any great amount of space for fitting them, and the whole device can be made more compact.

Figure 7:
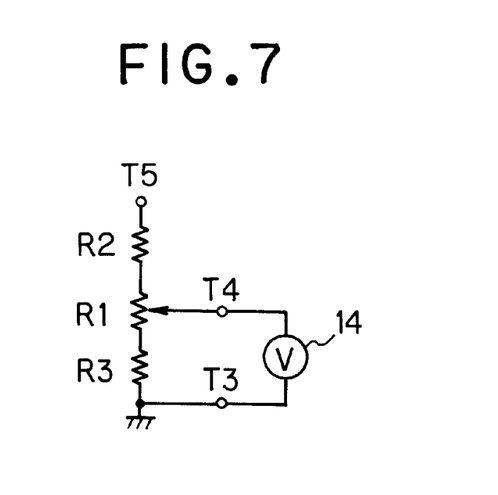
FIG. 7 illustrates the equalising circuit of the resistor substrate.
Figure 9:
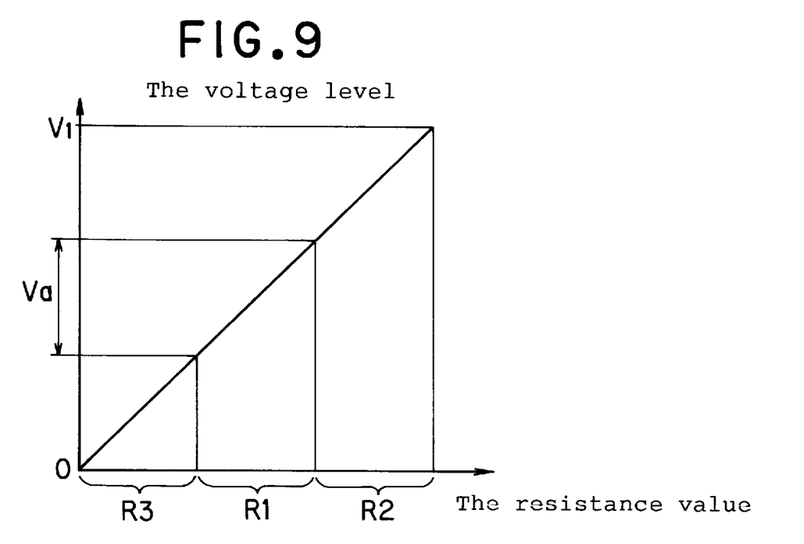
FIG. 9 illustrates the relationship between the first position of contact between the resistor and the contact member on the one hand, and the voltage level as measured by the voltmeter on the other.

Inasmuch as the resistances R2 and R3 are fitted at either end of the resistance R1, which is connected via these resistances R2 and R3 to the power source and earth terminals, it is possible to obtain for the voltage generated in the terminal T4 a level intermediate between the power source and the earth, as will be clear from the equalising circuit illustrated in FIG. 7 and the characteristics shown in FIG. 9. In other words, as FIG. 9 demonstrates, if the voltage level in the terminal T5 is V1, the voltage level obtained in the terminal T4 by moving the contact member 6 in relation to the resistance R1 will be within the range denoted by Va. Since an intermediate value of the whole voltage 0–V1 is used, the voltage level detected by the terminal T4 is less affected by noise and other factors, allowing the position of the mirror to be detected with a high degree of accuracy.

In addition, since the resistor substrate 4 and contact member 6 are inserted within the sliding block 7, which is prevented from rotating against the screw member 8, they are not subject to unnecessary turning force even when the nut adjuster rotates, as a result of which the contact member 6 is able to move along the resistor substrate 4 in a stable manner.

Figure 10:
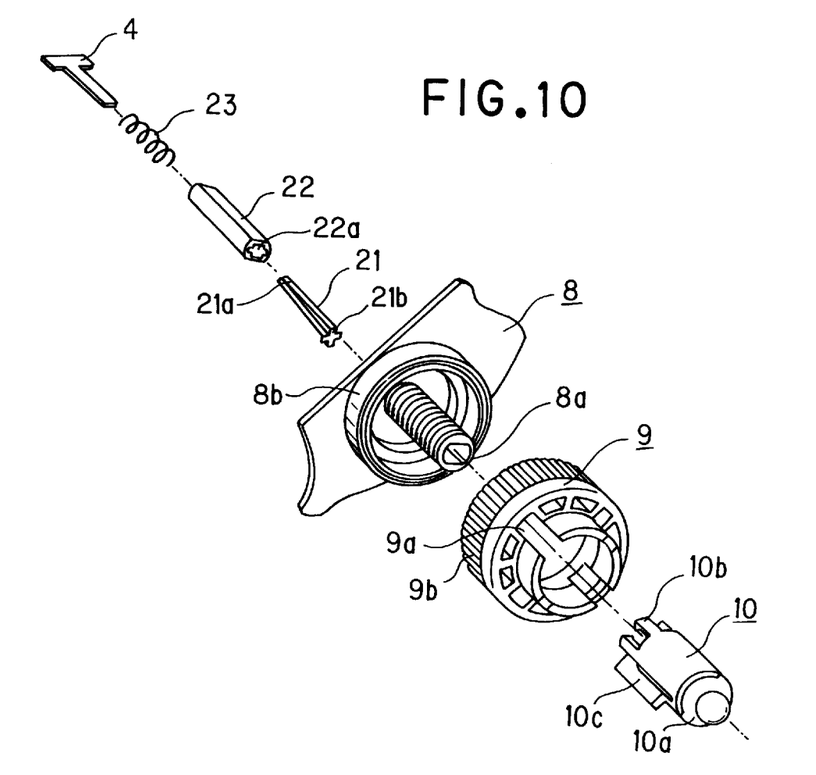
FIG. 10 is an exploded oblique view showing the detailed structure of the mirror position detection device to which the second embodiment of the present invention pertains.

There now follows a description of a second embodiment. As will be seen from FIG. 10, this mirror position detection device differs from the one illustrated in FIG. 2 in respect of the pin 5, contact member 6 and sliding block 7. Otherwise it is the same. In other words, the contact member 21 of the mirror position detection device illustrated in FIG. 10 has a bent-round section 21b which is of a different shape from that of the bent-round section 6b of the contact member 6, being configured like a cross. Moreover, the sliding block 22 has a cross-shaped aperture 22a which enables the cross-shaped bent-round section 21b of the contact member 21 to be inserted into it. Furthermore, it is configured in such a manner that when the contact member 21 is inserted into the sliding block 22, the cross-shaped bent-round section 21b of the contact member 21 is held in the aperture 22a of the sliding block 22. Meanwhile, a spring 23 (means of connection) is supplied in order to fix the contact medium 21 by pressing it against the inner surface 10d of the nut adjuster 10 (cf. FIG. 11). It should be added that the pin 5 is not present in the embodiment depicted in FIG. 10.

Figure 11:
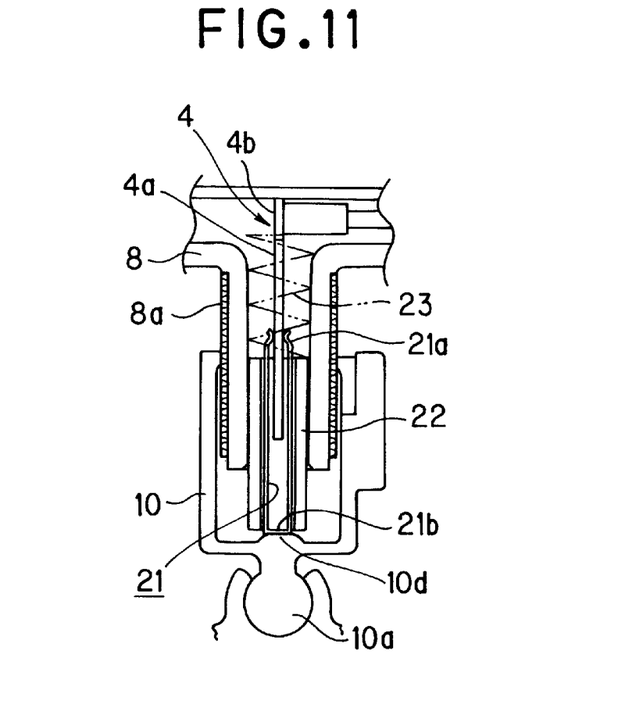
FIG. 11 is a cross-section of the mirror position detection device to which the second embodiment of the present invention pertains.

As FIG. 11 shows, the contact member 21 is positioned in such a manner as to nip the front and rear sides of the resistor substrate 4 within the sliding block 22. It is then held in the aperture 22a of the sliding block 22 by the cross-shaped bent-round section 21a of the contact member 21. Between the leading edge 22a of the sliding block 22 and the base 4b of the resistor substrate 4 is located the spring 23, the energising force of which serves to press the sliding block 22 against the inner surface 10d of the nut adjuster 10 (bottom of FIG. 11). As a result, the bent-round section 21b of the contact member 21 comes into contact with the inner surface 10d of the nut adjuster 10. Meanwhile, the site on the inner surface 10d of the nut adjuster 10 which comes into contact with the contact member 21 protrudes slightly in order to allow the inner surface 10d of the nut adjuster 10 to rotate smoothly against the bent-round section 21b of the contact member 21.

In the same way as the preceding embodiment, rotating the nut adjuster 10 allows it to move in relation to the male screw element 8a. Since the energising force of the spring 23 ensures that the contact member 21 is always pressed against the inner surface 10d of the nut adjuster 10, the contact member 21 also moves in line with the movement of the nut adjuster 10. The sliding block 22 is prevented from rotating against the screw member 8, and so does not rotate even when the nut adjuster 10 does, while the contact member 21 and the inner surface 10d of the nut adjuster 10 slide at the site of contact.

Thus, the contact member 21 also moves in line with the movement of the nut adjuster 10. As a result, the voltage of the terminal T4 changes in the same manner as in the previous embodiment in accordance with the movement of the contact member 21 illustrated in FIG. 9. By measuring this voltage it is possible to detect the angle of incline of the mirror 13. Meanwhile, the fact that the sliding block 22 prevents the contact member 21 from rotating means that it is possible to avoid damage and deterioration with age because the resistor substrate 4 is not subject to any unnecessary turning force. Moreover, in the second embodiment the bent-round section 21b of the contact member 21 and the internal surface 10d of the nut adjuster come into contact, with the result that there is little looseness when the contact member 21 moves, thus facilitating mirror position detection with a higher degree of accuracy.

What is claimed is:

1. A mirror position detection device housed within the mirror housing for the purpose of detecting the angle of incline of an automobile mirror wherein it is possible to adjust said angle of incline, comprising:

a direct-current power source;

a screw member fixed to the mirror housing, being in the shape of a hollow tube and being provided on its outer periphery with a screw groove;

a sliding block in the shape of a hollow tube, being inserted within the hollow section of the screw member and being prevented from rotating against the screw member;

a resistor substrate inserted within the hollow section of the sliding block and fixed to the mirror housing, to which resistor substrate is attached a first resistor having both ends connected to the direct-current power source;

an electrically conductive contact member inserted within the hollow section of the sliding block and capable of moving along the resistor substrate;

a sliding rod whereof the leading edge is connected to the rear side of the mirror, and on the trailing edge of which is formed a screw which engages with the screw groove in the fixed member;

means of connection which serves to link the contact member and the sliding rod in such a manner as to be capable of rotation;

means of rotating and driving which serves to rotate and drive the sliding rod; and means of measuring voltage, whereby the voltage level of the contact member is measured.

2. The mirror position detection device according to claim 1, which is provided coaxially to the sliding block with an adjusting gear being cylindrical in shape and having a gear groove formed on its outer periphery, a stopper being formed on the side of the sliding rod, while a groove which engages with this stopper is formed on the inner periphery of the adjusting gear, the sliding rod being caused to rotate by linking the gear groove on the outer periphery of the adjusting gear to the means of rotating and driving, and causing it to be rotated and driven.

3. The mirror position detection device according to claim 1, wherein the resistor substrate is flat and T-shaped, comprising a long section and a base section, the first resistor being attached to one side of the long section and the conductor to the other side, the contact member nipping one side and the other side of the long section to provide continuity between the first resistor and the conductor, while the means of measuring the voltage measures the voltage level of the contact member which is generated by virtue of the movement of the sliding rod.

4. The mirror position detection device according to claim 1, wherein one end of the first resistor is connected by way of a second resistor to one end of the direct-current power source, while the other end of the first resistor is connected by way of a third resistor to the other end of the direct-current power source.

5. The mirror position detection device according to claim 1, wherein the means of connection consists of a pin which by passing in turn through the contact member, sliding block and sliding rod serves to link the contact member to the sliding rod in such a manner as to be capable of rotating.

6. The mirror position detection device according to claim 1, wherein the means of connection consists of a spring which is located in such a manner that a restoring force is applied in a direction so as to distance the base of the resistor substrate from the sliding block, this restoring force serving to press and bring the contact member and sliding rod into contact in such a manner as to be capable of rotating.

* * * * *